US006921515B2

(12) United States Patent
Nagase et al.

(10) Patent No.: US 6,921,515 B2
(45) Date of Patent: Jul. 26, 2005

(54) APPARATUS FOR CHEMICAL DECONTAMINATION

(75) Inventors: Makoto Nagase, Mito (JP); Naohito Uetake, Hitachinaka (JP); Kazushige Ishida, Hitachi (JP); Fumito Nakamura, Mito (JP); Kazumi Anazawa, Hitachi (JP); Tadashi Tamagawa, Ebina (JP); Hiroo Yoshikawa, Sakai (JP)

(73) Assignees: Hitachi, Ltd., Tokyo (JP); Kurita Engineering Co., Ltd., Osaka (JP)

( * ) Notice: Subject to any disclaimer, the term of this patent is extended or adjusted under 35 U.S.C. 154(b) by 691 days.

(21) Appl. No.: 10/000,083

(22) Filed: Dec. 4, 2001

(65) Prior Publication Data

US 2002/0150523 A1 Oct. 17, 2002

Related U.S. Application Data

(62) Division of application No. 09/405,217, filed on Sep. 27, 1999, now Pat. No. 6,335,475.

(30) Foreign Application Priority Data

Sep. 29, 1998 (JP) .......................................... 10-274128

(51) Int. Cl.[7] ............................................... B32B 27/04

(52) U.S. Cl. ....................... 422/159; 422/159; 376/305; 376/310; 376/313; 376/314; 588/1; 134/3; 134/10

(58) Field of Search ............................. 422/159; 134/3, 134/10, 201, 94.1, 95.1; 588/1; 376/305, 310, 313, 314

(56) References Cited

U.S. PATENT DOCUMENTS 4,508,641 A 4/1985 Hanulik ......................... 588/3
4,729,855 A 3/1988 Murray et al. ................. 134/2
5,434,331 A 7/1995 Barkatt et al. ................. 588/1
5,489,735 A 2/1996 D'Muhala et al. ............. 588/1
5,619,545 A 4/1997 Grummon et al. .......... 376/195
5,764,717 A 6/1998 Rootham .................... 376/316
5,805,654 A 9/1998 Wood et al. ................ 376/313

FOREIGN PATENT DOCUMENTS

| | | |
|---|---|---|
| JP | 57-9885 | 10/1982 |
| JP | 62-250189 | 10/1987 |
| JP | 63-253300 | 10/1988 |
| JP | 1-242792 | 9/1989 |
| JP | 3-10919 | 2/1991 |
| JP | 6-99193 | 4/1994 |
| JP | 9-113690 | 5/1997 |
| JP | 9-510784 | 10/1997 |
| JP | 10-123293 | 5/1998 |

OTHER PUBLICATIONS

Lejon et al., "A Full System Decontamination of the Oskarshamn 1 BWR", Proceedings of the International Conference, Apr. 27, 1994, pp. 203–210.

*Primary Examiner*—Alexa Doroshenk
(74) *Attorney, Agent, or Firm*—Mattingly, Stanger & Malur, P.C.

(57) ABSTRACT

In a chemical decontamination apparatus, a catalyst decomposition column in an upstream side of an ion exchange resin column and a hydrogen peroxide injection apparatus in a further upstream side, reduce the amount of waste products caused by a chemical decontaminating agent where a mixed decontaminating agent for a composition trapped in a cation resin column and for a composition trapped in an anion exchange resin are used for the chemical decontaminating agent, selectively decompose the composition trapped in the cation resin column in an inlet side of a cleaning apparatus when radioactive nuclides in the decontaminating agent are cleansed using the cation resin column during decontamination, and decompose both compositions after completion of the decontamination. The chemical decontamination thus selectively decomposes the chemical decontaminating agent, which is a component of the load to the cation resin column.

7 Claims, 12 Drawing Sheets

| | OXALIC ACID | HYDRAZINE | HYDROGEN PEROXIDE |
|---|---|---|---|
| 0 | 0.96 | 0.92 | |
| 1 | 0.98 | 0.39 | 0.01 |
| 3 | 0.02 | 0.02 | 0.00 |
| 10 | 0.01 | 0.02 | 0.00 |

APPARATUS FOR CHEMICAL DECONTAMINATION

This is a divisional application of U.S. Ser. No. 09/405,217 filed Sep. 27, 1999, now U.S. Pat. No. 6,335,475.

BACKGROUND OF THE INVENTION

The present invention relates to a nuclear power plant of water cooling type and, more particularly, to a chemical decontamination method and a chemical decontamination system by which radioactive nuclides are chemically removed from metallic material surfaces of primary cooling system components and pipes and a system including the component and the pipes which are contaminated with radioactive nuclides.

As conventional technologies in connection with chemical decontamination, Japanese Patent publication No.3-10919 discloses a method in which components of a nuclear power plant made of metals are chemically decontaminated using permanganic acid as an oxidizing agent and dicarboxylic acid as a reducing agent. As methods of decomposing the above-mentioned organic acids, PCT/JP97/510784 discloses a method of decomposing the acid into carbon dioxide and water using an iron complex and ultraviolet rays. According to this method, since hydrogen peroxide of the oxidizing agent and the organic acid react by using the iron complex as a catalyst to produce carbon dioxide and water, the organic acid can be prevented from becoming waste products.

Although oxalic acid is used as the above organic acid, oxalic acid has a strong solvency for iron. Accordingly, when the decontaminating solution is allowed to flow through a system made of carbon steel which corrodes easily corroded compared to stainless steel, a large amount of iron ions are dissolved from the carbon steel to increase an amount of produced waste products, or the oxalic acid is precipitated in the form of iron oxalates. Therefore, a sufficient effect cannot be obtained in decontamination using oxalic acid of a system having low corrosion resistant materials such as carbon steel.

In order to apply the method to the system containing the low corrosion resistant materials, it is considered that hydrazine is added to oxalic acid in order to adjust so as to increase the pH of the decontaminating agent. However, since hydrazine is trapped in a cation exchange resin column (hereinafter, referred to as a cation resin column), the load of the cation resin column is increased when the decontaminating solution is allowed to directly flow into the cation resin column. Therefore, the amount of hydrazine exceeds an exchanging capacity of the cation resin column to cause hydrazine to flow out. As a result, the amount of hydrazine flowing out is increased as the load of metallic ions increases to excessively increase the pH of the decontaminating agent and accordingly to decrease the decontaminating effect. In order to avoid this problem, it is necessary to control the concentration of the hydrazine appropriately. The control means preferably decomposes into nitrogen and water. Although hydrazine can be decomposed by irradiating ultraviolet rays onto the hydrazine using a UV column (ultraviolet ray irradiation apparatus), the oxalic acid as well as the hydrazine is decomposed. It is difficult to selectively decompose only the hydrazine, and it is insufficient to reduce the load of the cation resin column because the ratio of decomposing hydrazine is low to produce ammonia. SFEA, [Actes de la Conférence Internationale Proceedings of the International Conference], Apr. 24–27, 1994, Nice-France page203–210 "A FULL SYSTEM DECONTAMINATION OF THE OSKARSHAMN 1 BWR" by Johan Lejon and Ása Hermansson.

SUMMARY OF THE INVENTION

A first object of the present invention is to provide a chemical decontamination method and a chemical decontamination system comprising a chemical decontaminating agent decomposing apparatus for selectively decomposing hydrazine which are components of the load to the cation resin column. Further, after completion of the decontamination process, it is important that the decomposing agent does not become waste products by decomposing not only the components to be trapped by the cation exchange resin but also components to be trapped by an anion exchange resin. However, there is a problem in that provision of a plurality of the decomposing apparatuses increases the cost of system. A second object of the present invention is to provide a chemical decontamination method which moderates corrosion of material by using a chemical decontaminating agent decomposing apparatus capable of decomposing not only the components trapped by the cation exchange resin but also components trapped by an anion exchange resin at a time.

Key points of the present invention are as follows.

(1) The present invention provides a chemical decontamination method of chemically decontaminating radioactive nuclides from a metallic material surface contaminated by the radioactive nuclides, the method comprising the processes of reductively decontaminating using a reductive decontaminating agent containing at least two kinds of components; and then decomposing the reductive decontaminating agent using a decomposing apparatus for decomposing at least two kinds of chemical substances in the reductive decontaminating agent.

The present invention provides the chemical decontamination method in the above-mentioned item (1), wherein in the process of decomposing the reductive decontaminating agent using the decomposing apparatus, the at least two kinds of chemical substances in the reductive decontaminating agent are decomposed at the same time.

Further, the present invention provides the chemical decontamination method, wherein when the apparatus for decomposing at least two kinds of chemical substances in the reductive decontaminating agent cleanses radioactive nuclides from the decontaminating agent using a cation resin column during decontaminating, a composition trapped by the cation resin column at an inlet side of a cleaning apparatus is selectively decomposed.

Furthermore, the present invention provides the above chemical decontamination method, wherein in the above-mentioned decomposing apparatus for the reductive decontaminating agent, a composition trapped by the cation resin column at the inlet side of the cleaning apparatus is selectively decomposed when the radioactive nuclides in the decontaminating agent are cleansed using the cation resin column during decontaminating, and at least two kinds of compositions are decomposed at the same time by controlling an adding amount of hydrogen peroxide after completion of the decontaminating step, and the reductive decontaminating agent includes oxalic acid and hydrazine as the compositions.

(2) The present invention provides a chemical decontamination method of chemically decontaminating radioactive nuclides from a metallic material surface contaminated by the radioactive nuclides, the method comprising the processes of reductively decontaminating using a reductive decontaminating agent; and then decomposing the reductive decontaminating agent using a decomposing apparatus for decomposing at least oxalic acid and hydrazine in the reductive decontaminating agent.

The present invention provides the chemical decontamination method of the above-mentioned items (1) and (2), wherein the reductive decontaminating agent contains oxalic acid and hydrazine, and is a reductive acid solution of which a concentration of oxalic acid is 0.05 to 0.3 wt % and a pH is 2 to 3. Otherwise, the chemical decontamination method further comprises an oxidative, dissolving process for oxidatively dissolving chromium in a metal oxide on the metallic material surface contaminated by the radioactive nuclides into hexadic chromium using permanganate before or after the reductive dissolving process for dissolving and removing the metal oxide.

Further, the present invention provides the chemical decontamination method in the above-described item (2), wherein the reductive dissolving process and the oxidative dissolving process are alternatively performed, and the reductive dissolving process is performed at least twice.

Furthermore, the chemical decontamination method in the above-described items (1) and (2), wherein a catalyst decomposition column is used as the decomposing apparatus for the reductive decontaminating agent, and at least one element selected from the group consisting of platinum, ruthenium, vanadium, palladium, iridium and rhodium is used as a catalyst filled in the catalyst column and an oxidizing agent is supplied in an inlet side of the catalyst column.

Further, the present invention provides the chemical decontamination method in the above-mentioned items (1) and (2) wherein a quantity of hydrogen peroxide added is less than an equivalent weight of the components trapped in the cation resin column when components trapped in the cation resin column are selectively decomposed, and a quantity of hydrogen peroxide added is more than an equivalent weight react with the components trapped in the cation resin column when components trapped in the cation resin column and components trapped in the anion resin column are decomposed at the same time.

(3) The present invention provides a chemical decontaminating system, which comprises a catalyst decomposition column in an upstream side of an ion exchange resin column and a hydrogen peroxide injection apparatus in a further upstream side in order to reduce an amount of waste products caused by a chemical decontaminating agent in a case where a mixed decontaminating agent for a composition trapped in a cation resin column and for a composition trapped in an anion exchange resin is used for the chemical decontaminating agent, and in order to selectively decompose the composition trapped in a cation resin column in an inlet side of a cleaning apparatus when radioactive nuclides in the decontaminating agent are cleansed using the cation resin column during decontaminating and decompose the both compositions after completion of decontaminating process.

The present invention provides the chemical decontaminating system in the above item (3), which further comprises a gas-liquid separating apparatus for separating decomposed gas in a downstream side of the catalyst decomposition column and in an upstream side of the ion exchange resin.

DESCRIPTION OF REFERENCE CHARACTERS

1 . . . decontaminated part, 2 . . . circulation line, 3 . . . circulation pump, 4 . . . heater, 5 . . . cooler, 6 . . . catalyst decomposition column, 7 . . . cation resin column, 8 . . . agent tank, 9 . . . agent injection pump, 10 . . . pH adjusting agent tank, 11 . . . pH adjusting agent injection pump, 13 . . . hydrogen peroxide injection pump, 14 . . . mixed-bed resin column, 15 . . . gas-liquid separating tank, 16 . . . UV column, 31 to 45 . . . valve (a solid valve indicates closed, and a hollow valve indicates opened).

DESCRIPTION OF THE PREFERRED EMBODIMENTS

The present invention will be described below in detail, referring to embodiments.

[Embodiment 1]

Figure 1:
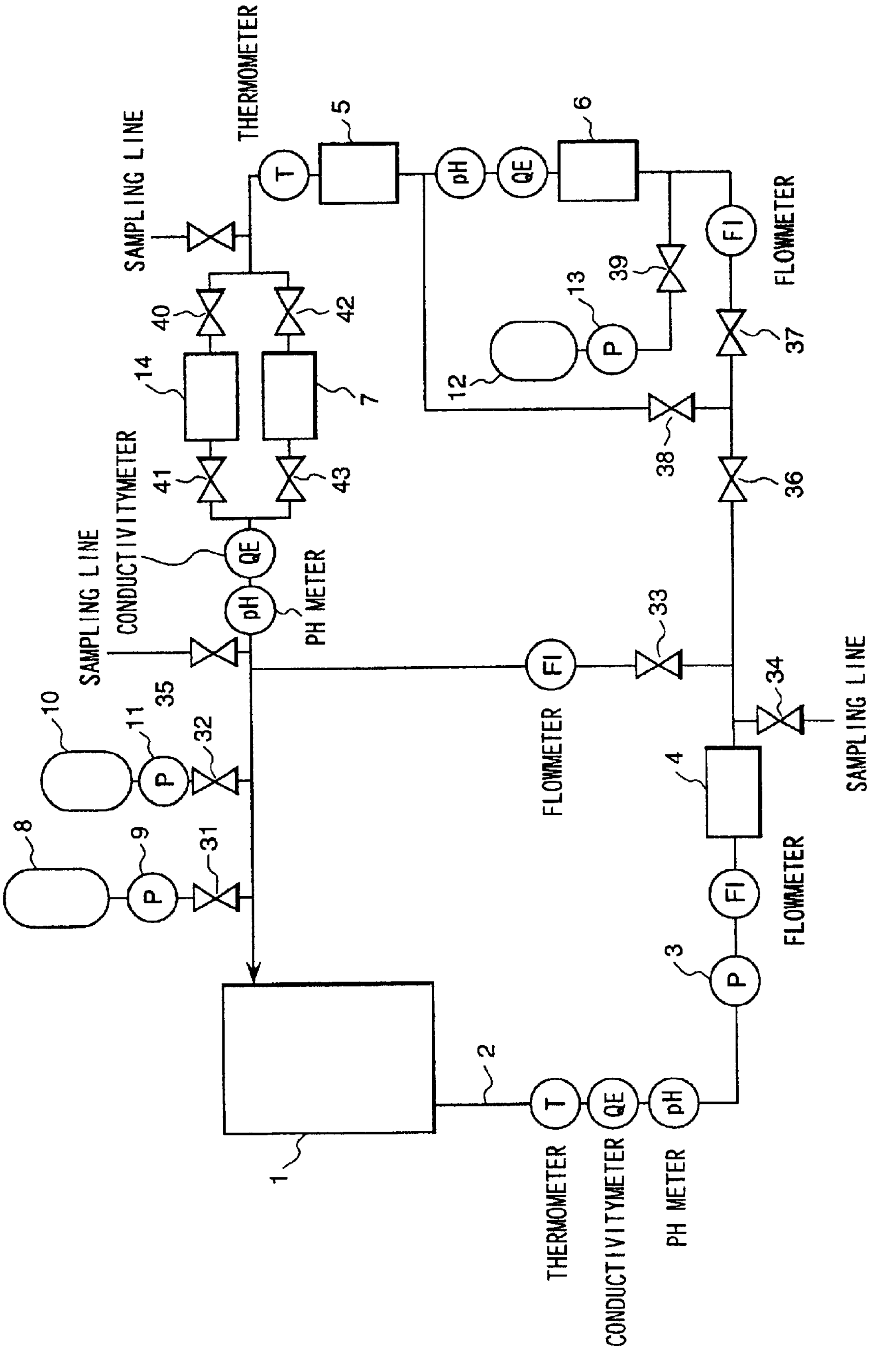
FIG. 1 is a diagram showing the basic system configuration of a chemical decontamination system to which an embodiment of a chemical decontamination method in accordance with the present invention is applied.

FIG. 1 is a diagram showing the basic system configuration of a chemical decontamination system to which an embodiment of a chemical decontamination method in accordance with the present invention is applied. Components used for performing decontamination are a circulation line 2 connected to a portion 1 to be decontaminated (pipes of a nuclear power plant and so on), a circulation pump 3, a heater 4, a cooler 5, a catalyst decomposition column 6, a cation resin column 7, an agent tank 8, an agent injection pump 9, a pH adjusting agent tank 10, a pH adjusting agent injection pump 11, a hydrogen peroxide tank 12, a hydrogen peroxide injection pump 13 and a mixed-bed resin column 14. Each of the above-described components and each valve to be described later are connected with a piping path.

Figure 7A:
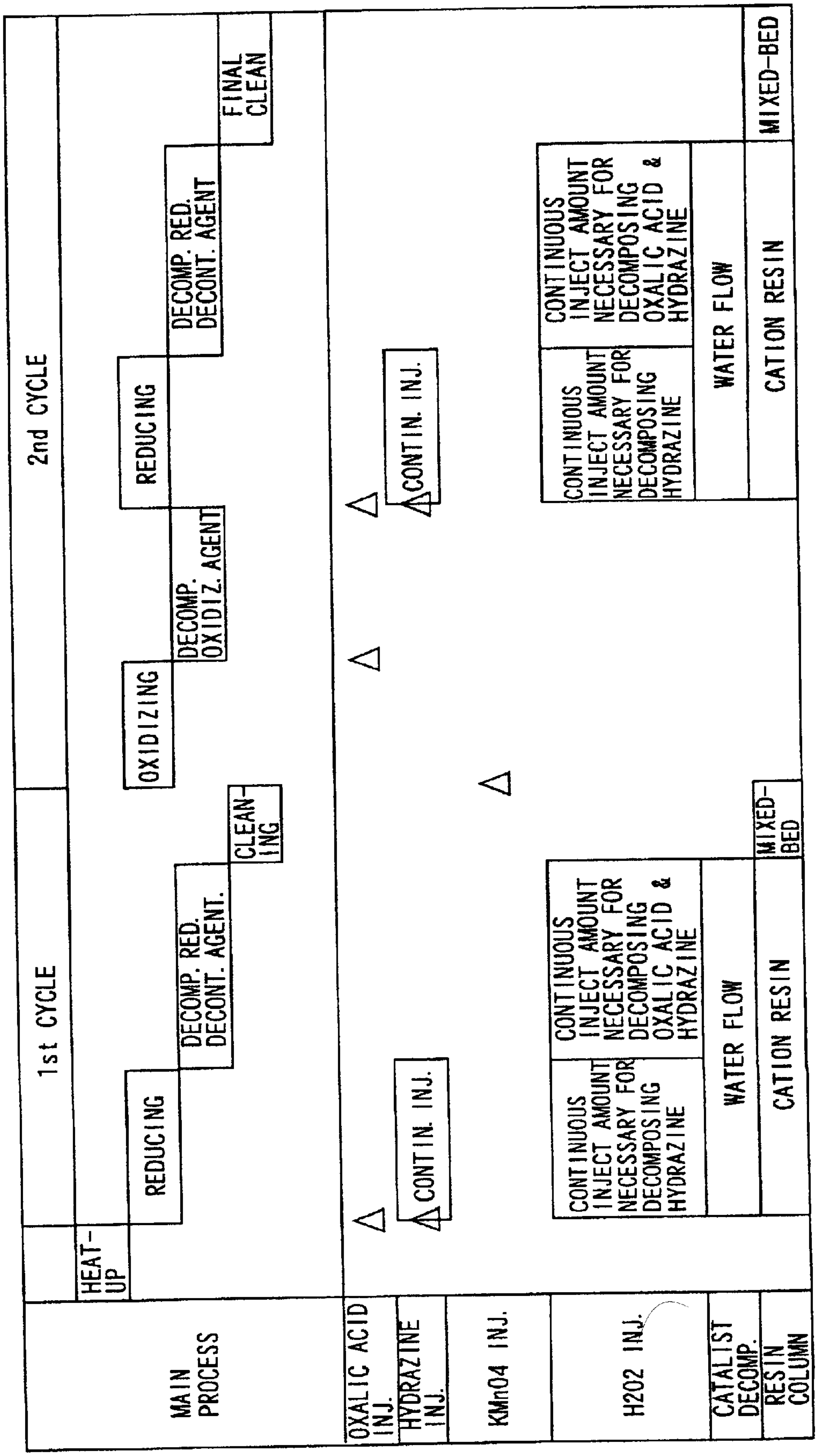
FIG. 7 is charts showing processes of various embodiments of chemical decontamination methods in accordance with the present invention. Therein, (A), (B) and (C) show main processes of Embodiment 1, Embodiment 3 and Embodiment 4, respectively.

FIG. 7(A) shows a main process of the present embodiment of a chemical decontamination method. The reducing treatment shown in FIG. 7 indicates decontamination using a reductive agent, and oxidative treatment indicates decontamination using an oxidizing agent.

Figure 2:
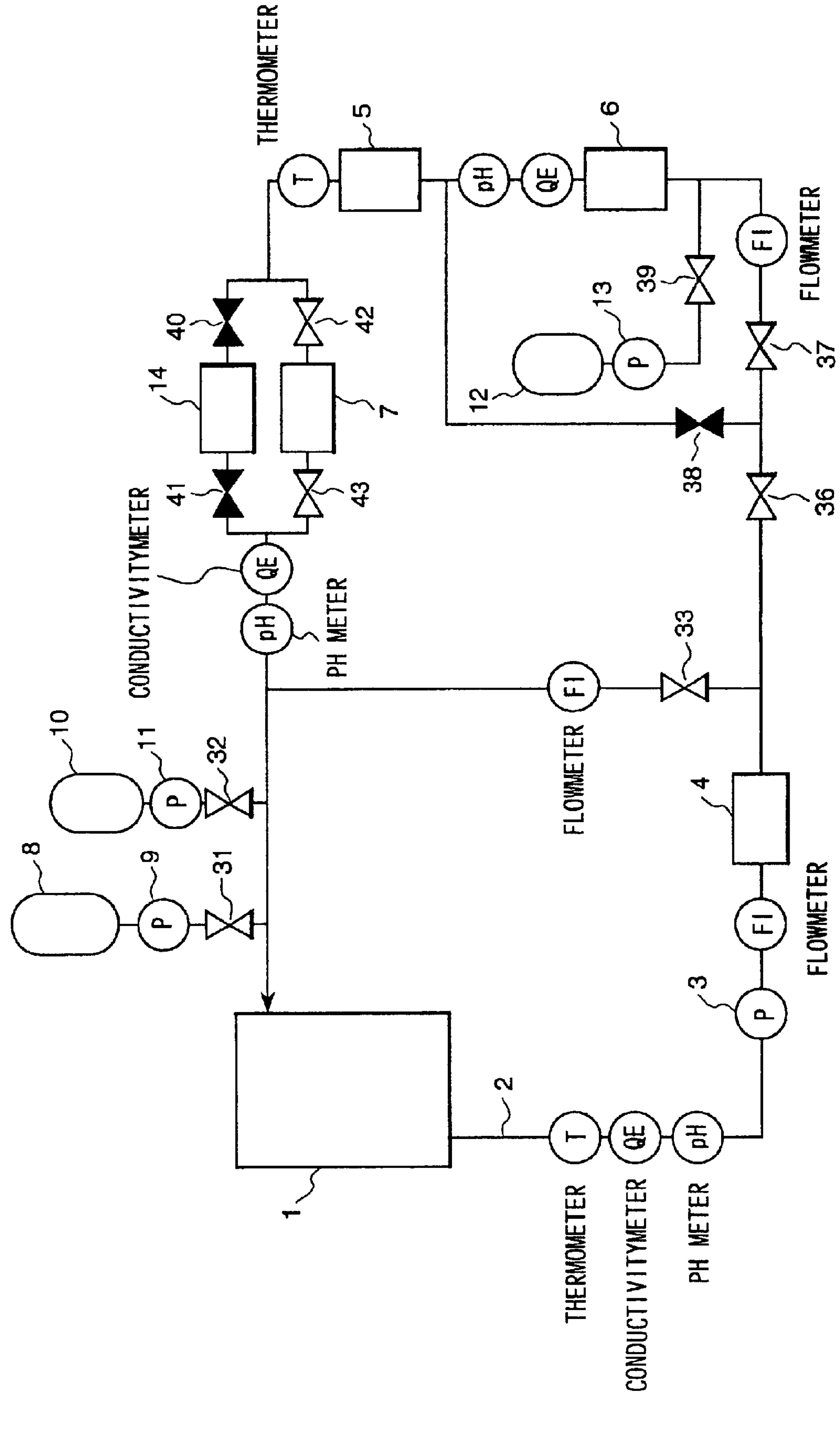
FIG. 2 is an explanatory diagram showing a reducing decontaminating agent injection mode in a decontamination process.

Initially, heat-up mode in the first cycle of FIG. 7(A) is performed. In the heat-up mode, valves 31, 32, and 34 to 43 are closed and a valve 33 is opened. A circulation operation is performed by driving the circulation pump 3 to allow water to flow in a direction shown by an arrow of the circulation line 2 through the portion 1 to be decontaminated, and the liquid temperature of a decontaminating solution is heated up to 90±5° C. using the heater 4. The temperature is controlled using a thermometer in an outlet side of the portion to be decontaminated. After completion of heating-up, a reducing agent decontamination mode of the first cycle of FIG. 7(A) is performed. Initially, a reducing agent injection mode shown in FIG. 2 is performed. In this mode, the valves 38, 40, 41 are closed and the other valves are opened. A solid valve in FIG. 2 to FIG. 6 indicates that the valve is closed, and a hollow valve indicates that the valve is opened.

Predetermined quantities of oxalic acid from the agent tank 8 and hydrazine from the pH adjusting tank 10 are injected into the portion 1 to be decontaminated using pumps 9 and 11, respectively. After starting the injection, water is allowed to flow through the cation resin column 7 in order to collect metallic ions mainly composed of radioactive nuclides and iron dissolved out of the portion 1 to be decontaminated.

Since hydrazine of the pH adjusting agent is trapped in the cation resin column 7, hydrazine is decomposed in the catalyst decomposition column 6 while hydrogen peroxide is being injected before water is allowed to flow through the cation resin column 7. The injecting amount of hydrogen peroxide is controlled so as to become a molar number twice as large as a molar concentration of the hydrazine.

Figure 3:
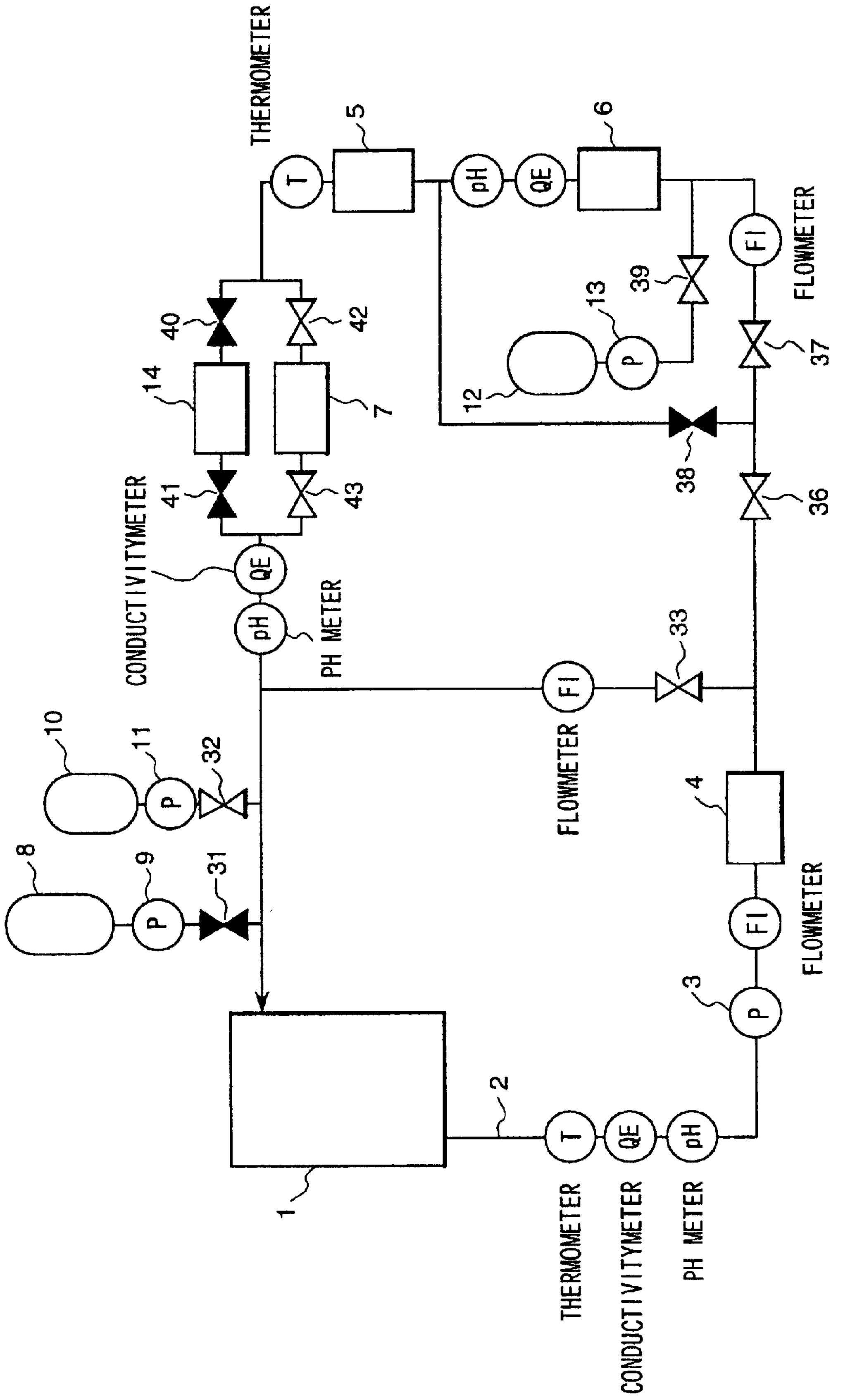
FIG. 3 is an explanatory diagram showing a reducing agent decontamination mode in the decontamination process.

By doing so, decomposition of the oxalic acid component can be suppressed and only the hydrazine can be selectively decomposed. After adjusting the oxalic acid concentration in the system to 2000 ppm and an indication value of the pH meter in the outlet side of the portion 1 to be decontaminated to 2.5, the reducing agent decontamination mode (the first cycle of FIG. 7(A)) shown in FIG. 3 is performed. In this mode, by closing the valve 31 to stop injecting oxalic acid, decontamination is performed while only hydrazine is being continuously injected by an amount decomposed in the catalyst decomposition column 6 to maintain the pH to 2.5. After a predetermined time period or at the time when dissolution of radioactivity becomes small, the reducing agent decontamination is completed and the processing proceeds to reductive decontaminating agent decomposition mode.

Figure 4:
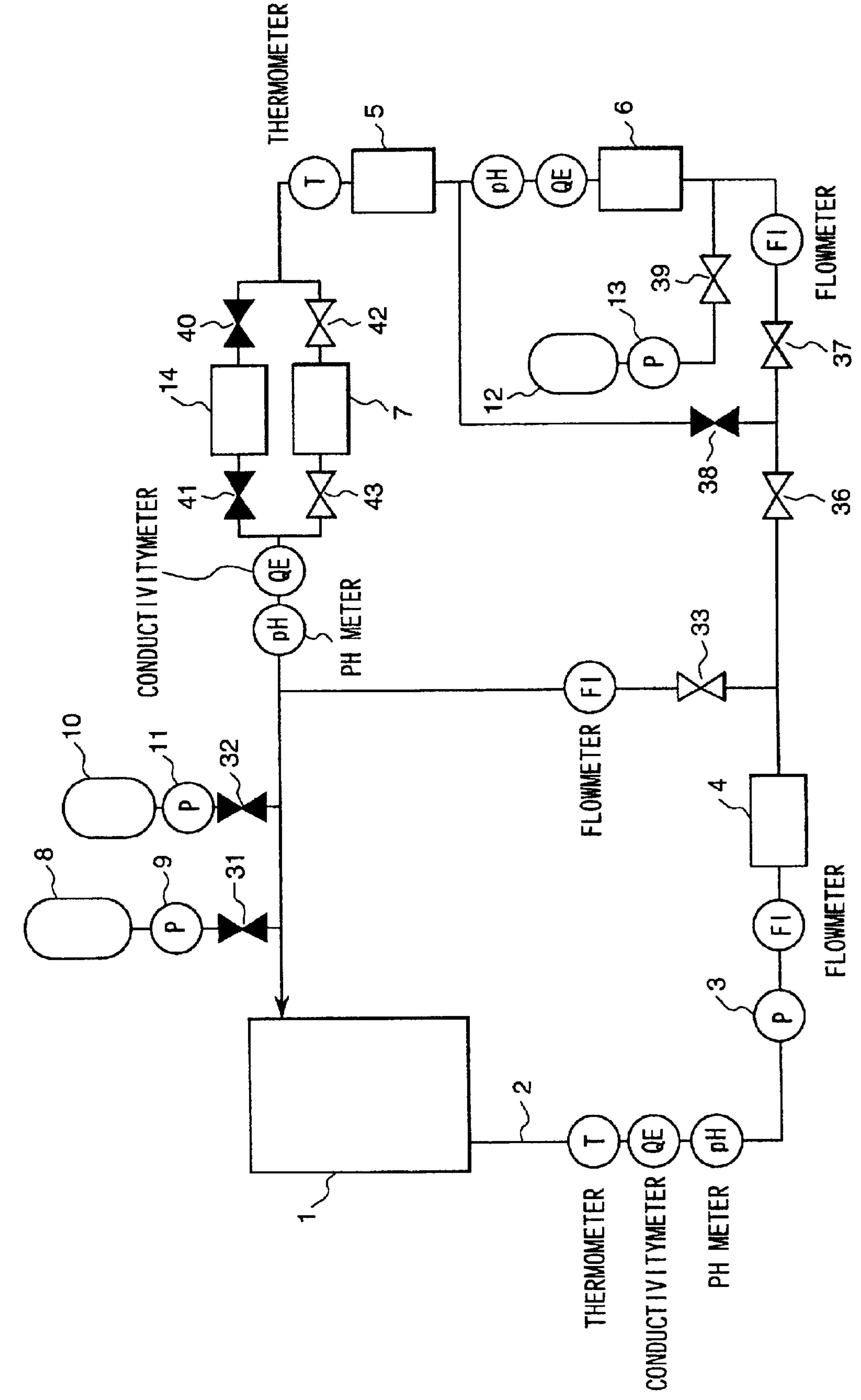
FIG. 4 is an explanatory diagram showing a reducing decontamination agent decomposing mode in the decontamination process.

FIG. 4 shows detailed contents of the reductive decontaminating agent decomposition mode of FIG. 7(A). The valve 32 is also closed to stop injecting hydrazine, and oxalic acid as well as hydrazine is decomposed at a time by adding an injecting amount of hydrogen peroxide by a mole equal to the molar concentration of oxalic acid.

Since the concentration of oxalic acid in the system is decreased every moment, the injecting amount of hydrogen peroxide is decreased by controlling an opening degree of the valve 39 based on an indication of a conductivity meter in an outlet side of the portion 1 to be decontaminated, utilizing the fact that the concentration of oxalic acid is nearly in a proportional relationship to the conductivity. It is confirmed by analyzing the sampling water sampled through a sampling line in an outlet side of the heater 4 that the concentration of oxalic acid in the system becomes below 10 ppm and the concentration of hydrazine becomes below 5 ppm, and then the reductive decontaminating agent decomposing process (the first cycle of FIG. 7(A)) is completed.

Figure 5:
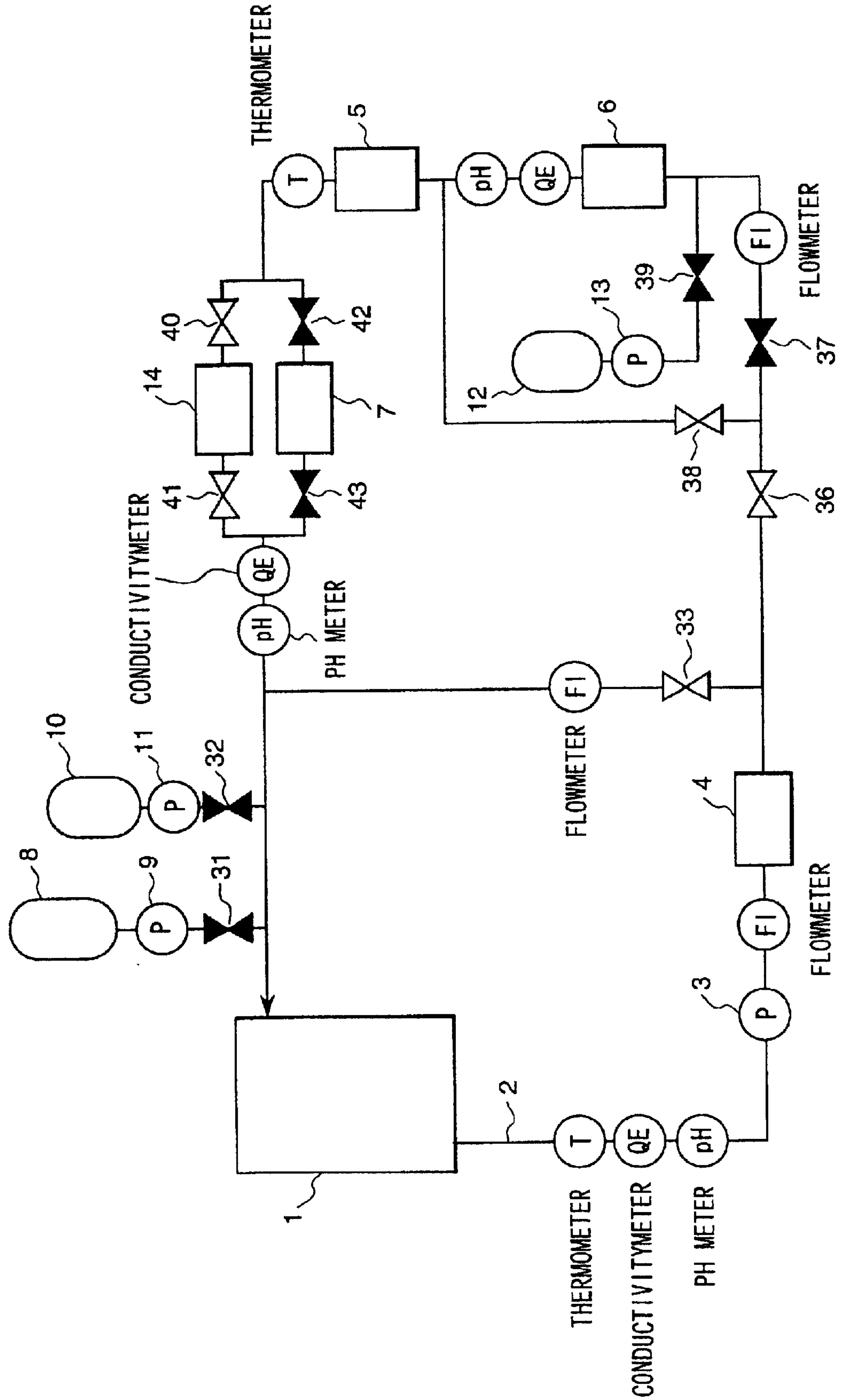
FIG. 5 is an explanatory diagram showing a cleaning mode in the decontamination process.

After that, a cleaning mode shown in FIG. 5 (the first cycle of FIG. 7(A)) is performed because the cation resin column 7 can not remove chromic acid ions of an anion component. The valves 37, 39, 42 43 are closed and the valves 38, 40, 41 are opened. By doing so, water is allowed to flow through the mixed-bed resin column 14 in the system to perform cleaning of the system water for a predetermined time period.

Figure 6:
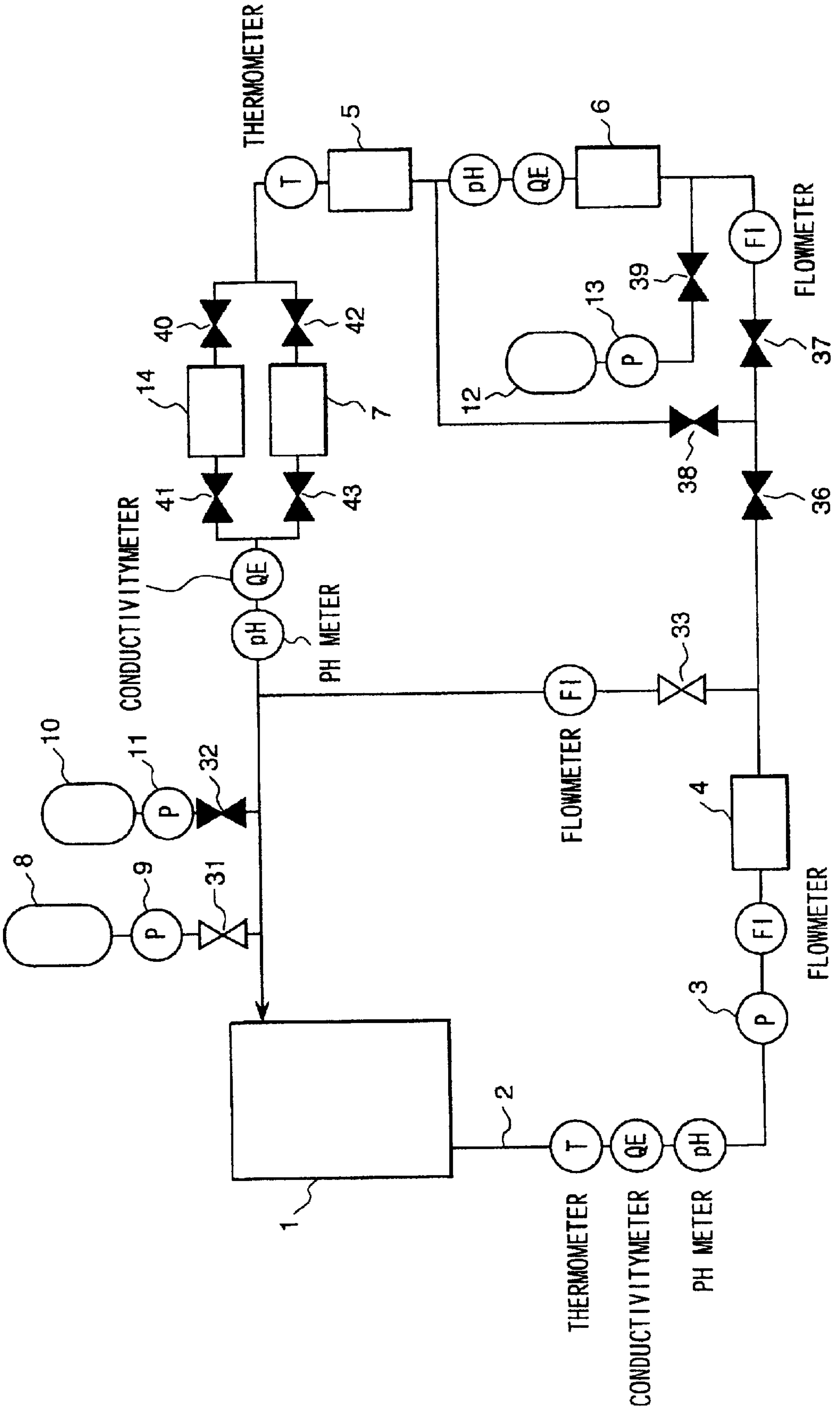
FIG. 6 is an explanatory diagram showing a oxidizing agent injection mode and oxidizing agent decontamination mode in the decontamination process.

Next, the process enters the second cycle of FIG. 7(A) to perform an oxidizing agent decontamination mode and an oxidizing agent decomposition mode shown in FIG. 6. All valves except for the valve 33 are closed. In the oxidizing agent decontamination mode, potassium permanganate of the oxidizing agent is injected from an agent tank (not shown in the figure) and the concentration of potassium permanganate in the system is adjusted to 300 ppm. After the predetermined concentration of the oxidizing agent is obtained, injection of potassium permanganate is stopped and the oxidizing decontamination to the portion 1 to be decontaminated using the potassium permanganate solution is performed for a predetermined time period.

After completion of the oxidizing agent decontamination, the oxidizing agent decomposing mode of FIG. 7(A) is performed. In this mode, an amount of oxalic acid of a molar concentration 7 times as much as the molar concentration of the potassium permanganate is injected from the agent tank 8 to decompose permanganate ions to bivalent manganese ions so as to be cleansed by the cation column 7. Carbon dioxide gas generated at the decomposition is exhausted using a vent system provided in the system.

After the decomposition is completed and the system water becomes transparent, the second reducing agent decontamination mode, the second reducing agent decomposition mode and the final cleaning mode showing the second cycle of FIG. 7(A) are performed. In the second reducing agent decontamination mode, reducing agent decontamination is performed by adjusting the decontaminating solution to the oxalic acid concentration of 2000 ppm and the pH of 2.5 while oxalic acid and hydrazine are being injected to compensate for insufficient amounts of them.

The processing after that is the same as that in the first reducing agent decontamination process, that is, decontamination is performed by repeating the oxidizing and the reducing agent decontamination processes necessary times, the final cleaning is performed after decomposing the reducing agent following to sufficient removing of radioactivity of the portion to be decontaminated, cleaning is performed using the mixed-bed resin column 14 until the conductivity of the system water becomes below 1 $\mu$s/cm, and thus the decontamination is completed.

In order to obtain information on the removed radioactivity and the removed amount of metals, sample water is sampled from sampling lines arranged in the inlet and the outlet of the resin columns 7 and 14 to analyze radioactive nuclides and metallic concentrations in the sample water, and the load to the cation resin column 7 (or the mixed-bed resin column 14) can be calculated using a water flow rate and a water flowing time to the resin column 7 (or the resin column 14).

The above will be described below in more detail, assuming that a reductive decontaminating agent adjusted to pH 2.5 by adding hydrazine to oxalic acid of 0.2% and an oxidative decontaminating agent of potassium permanganate of 0.03% are used as the decontaminating agents. In the reducing agent decontamination process, the water is heated up using the circulation pump 3 and the heater 4 as shown in FIG. 2, and oxalic acid of the main component of the reductive decontaminating agent is injected into the system from the agent tank 8 using the agent injection pump 9. At the same time, hydrazine of the pH adjusting agent is injected into the system from the pH adjusting agent tank 10 using the pH adjusting agent injection pump 11. At the same time when the decontaminating agent is injected, hydrogen peroxide is injected in the upstream side of the catalyst decomposition column 6 from the hydrogen peroxide tank 12 using the hydrogen peroxide injection pump 13. The injection amount of hydrogen peroxide is an amount necessary for decomposing hydrazine depending on the concentration of hydrazine in the decontaminating solution. In more detail, the upper limit is twice as much as the molar concentration of hydrazine. By doing so, the hydrazine is preferentially decomposed in the catalyst decomposition column 6, and the load to the cation resin filled in the cation resin column 7 is suppressed. At the time when the concentration of oxalic acid reaches a predetermined concentration (0.2%), operation of the agent injection pump 9 is stopped to end injection of oxalic acid and to switch to injection of only hydrazine in order to supply hydrazine decomposed and removed by the catalyst decomposition column 6.

In the step of decomposing the reductive decontaminating agent after completion of the reducing agent decontamination process (4 hours to 15 hours), operation of the pH adjusting agent injection pump is stopped to increase an adding amount of hydrogen peroxide supplied to the catalyst decomposition column and to change the operating mode so that decomposition of oxalic acid as well as hydrazine is progressed. The concentration of hydrogen peroxide at that time is within the range between a molar concentration equal to a value of the sum of twice the molar concentration of hydrazine and the molar concentration of oxalic acid as the lower limit and three times of the value as the upper limit, but operation near the lower limit is preferable. The reason why the upper limit is set to the hydrogen peroxide concentration is as follows. That is, although hydrogen peroxide not contributing to the reaction in the catalyst decomposition column is decomposed into oxygen and water by the catalyst, a large amount of partially un-decomposed hydrogen peroxide flows out to the downstream side of the catalyst decomposition column 6. In such a case, because the ion exchange resin is deteriorated by the hydrogen peroxide, the radioactive nuclides and so on trapped to the ion exchange resin may be released. Since the concentration of hydrogen peroxide in the system is decreased as decomposition of the reductive decontaminating agent is progressed, the injecting amount of hydrogen peroxide is gradually decreased by continuously or intermittently measuring the concentration of decontaminating agent. By doing so, almost all the reductive decontaminating agent in the system is decomposed and, accordingly, the load to the ion exchange resin caused by the un-decomposed reductive decontaminating agent can be suppressed.

After completion of decomposing the reductive decontaminating agent, water is allowed to flow through the mixed-bed resin column 14 (or the anion resin column) to remove chromic acid ions remaining in the system water, and potassium permanganate of the oxidative decontaminating agent is injected into the system from the agent injection tank 8 using the agent injection pump 9 to adjust the concentration to a predetermined value (0.05%). At that time, the catalyst column 6 and the resin column 7 are isolated by closing valves. This is because the catalyst and the ion exchange resin are prevented from being deteriorated by the oxidizing agent.

After completion of the oxidizing agent decontamination process (4 hours to 8 hours), oxalic acid and hydrazine are again injected in order to decompose and reduce permanganate ions into bivalent manganese ions. After completion of the decomposition, water is re-started to flow through the cation resin column 7 to remove radioactivity and manganese ions, potassium ions released from the cation resin column 7 while hydrogen peroxide is added to the catalyst column 6 by an amount necessary for decomposing the hydrazine, similar to the initial reducing agent decontamination process.

After completion of the second reducing agent decontamination process, the reducing agent is decomposed in the same procedure as that in the first reducing agent decomposition process, and after completion of the decomposition the final cleaning is performed using the mixed-bed resin. Although the process in FIG. 7 is assumed to be a the 2-cycle process, it is possible to employ a 3-cycle process if a higher decontamination effect is required. In a case of three or more cycles, one cycle is composed of the oxidizing agent decontamination process, the oxidizing agent decomposition process, the reducing agent decontamination process, the reducing agent decontamination process and the cleaning process, and the process may be modified by inserting the necessary number of the cycles between the first cycle and the second cycle.

Catalysts capable of being used for decomposing the reductive decomposing agent are noble metal catalysts such as platinum, ruthenium, rhodium, iridium, vanadium, palladium catalysts and the like. A measured result of the decomposition ratio is performed at a certain time after adding the catalyst into a beaker. It can be understood from the result that ruthenium catalyst is preferable from the viewpoint of decomposition ratio. Further, it is known that ruthenium catalyst is also effective to decomposition of hydrazine. The decomposition efficiency of ruthenium catalyst to hydrazine is, however, extremely decreased when oxalic acid is mixed in the decontaminating solution, but the decomposition can be progressed by adding hydrogen peroxide to the decontaminating solution.

Figure 8:
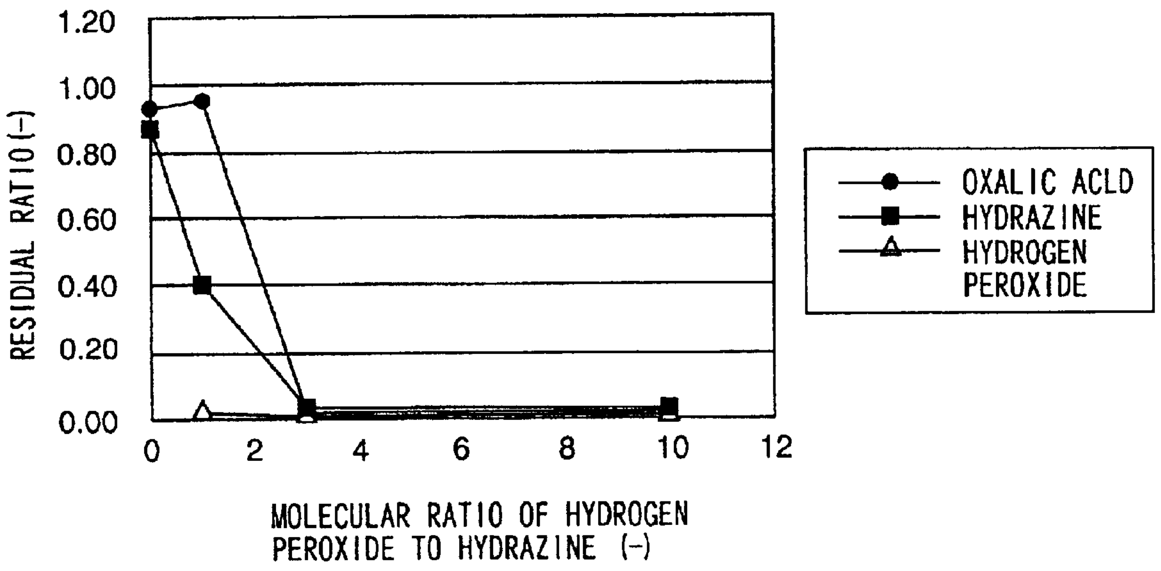
FIG. 8 is a graph showing test results of residual ratios of hydrazine, oxalic acid and hydrogen peroxide when water is passed through a Ru catalyst column.

A test was conducted to study decomposition ratios for hydrazine and oxalic acid in the catalyst decomposition column 6. The test was conducted by using 0.5% ruthenium-carbon particles made by N. E. Chemcat Co., and a pre-heated decontaminating solution added with hydrogen peroxide was allowed to flow at a speed of SV 30 to the catalyst decomposition column 6 set to the outer surface temperature of 95° C. of the upper limit temperature of the decontaminating agent. The test result is shown in FIG. 8. In the case where hydrogen peroxide was not added, both of hydrazine and oxalic acid were little decomposed. In a case where hydrogen peroxide was added by a mole equivalent to a mole of hydrazine, the decomposition ratio for hydrazine was approximately 60%, but oxalic acid was little decomposed. In a case where hydrogen peroxide was added by 3 times as much as the mole of hydrazine, the decomposition ratio for hydrazine was above 98% and the decomposition ratio for oxalic acid was approximately 99%. In a case where hydrogen peroxide was added by 10 times as much as the mole of hydrazine, the result was nearly equal to that in the case where hydrogen peroxide was added by 3 times as much as the mole of hydrazine. In any of the cases, the concentration of hydrogen peroxide at the outlet was below the detection limit. That is, in a case where the catalyst decomposition column 6 is designed under the condition of SV 30, the volume of the catalyst filling portion becomes 100 L when the water flow rate to the catalyst decomposition column 6 is 3 $m^3$/h.

Since nitrogen is produced when hydrazine is decomposed and carbon dioxide gas is produced when oxalic acid is decomposed, these gases need to be exhausted outside the system. Although no apparatus for removing the gases is shown in FIG. 1, it is possible to cope with this problem by arranging a vent mechanism having a vent cooler 14 for separating and removing the produced gases in the catalyst decomposition column 6.

Although trivalent iron complex and bivalent iron ions are produced by the decontamination, the bivalent iron ions can be removed by the cation resin column 7 in the reducing agent decontamination process. Nearly one-half of the trivalent iron complex is removed by the cation resin column 7 in the reducing agent decontamination process. The residual amount of the trivalent iron complex becomes iron hydride by hydrogen peroxide injected in the reducing agent decontamination process and removed by the catalyst.

According to the present embodiment, the pH is moderated to 2.5 because hydrazine is added, and consequently the base material of the portion 1 to be decontaminated is suppressed to be dissolved. Therefore, the amount of produced radioactive waste products can be reduced and thinning of the base material can be suppressed. Particularly, when the base material of the portion 1 to be decontaminated is low anti-corrosion carbon steel, the effect of reducing corrosion is very large.

[Embodiment 2]

Although in Embodiment 1 the vent mechanism is arranged in the catalyst decomposition column 6 in order to remove the produced gas, a gas-liquid separating tank having a vent cooler for separating the gas may be arranged downstream of the catalyst decomposition column 6 and upstream of the cation resin column 7. In this case, there is an advantage in that the gas-liquid separating tank 13 can be also used as a buffer for receiving a volume of liquid increased by injection of the agent.

[Embodiment 3]

Figure 9:
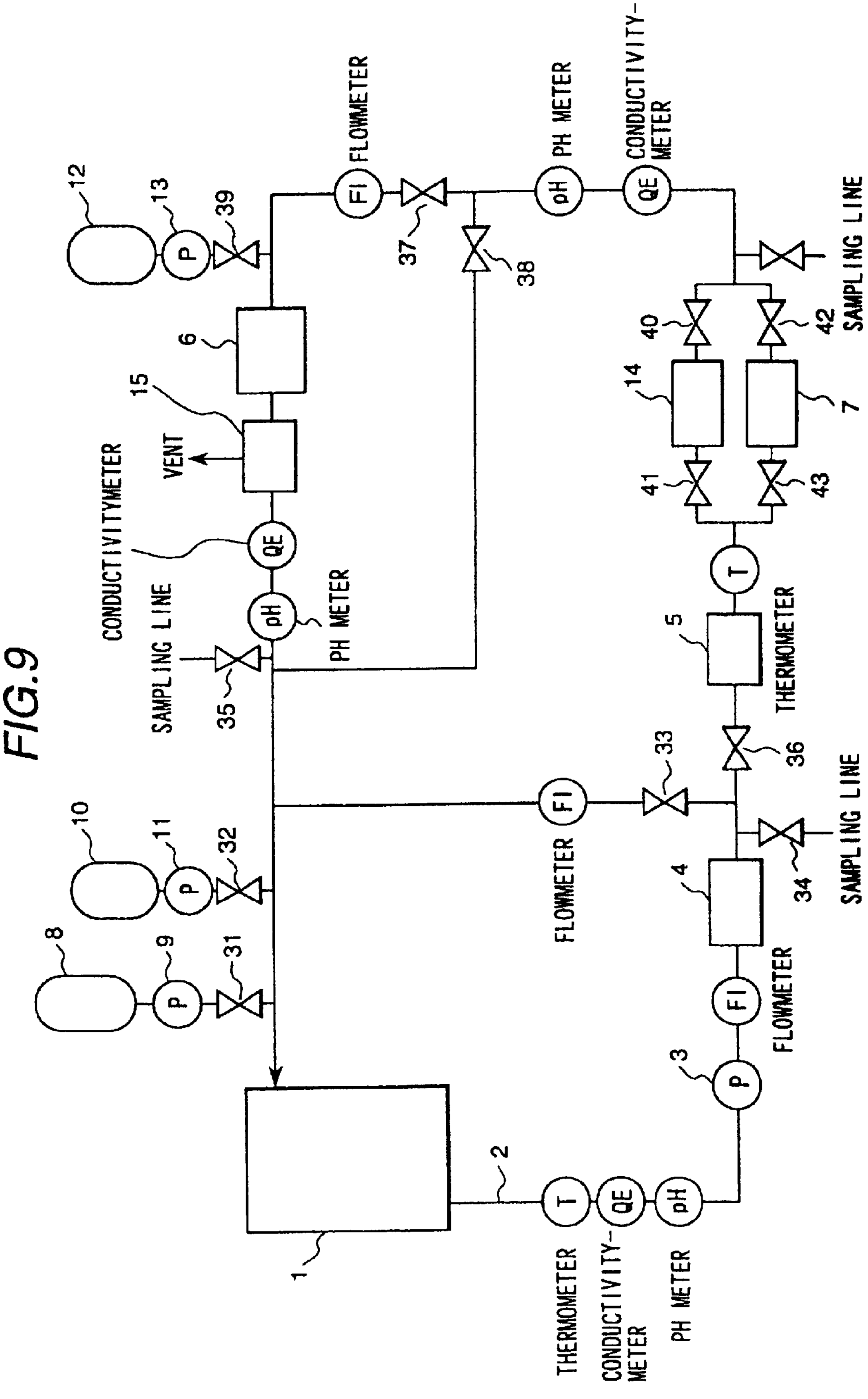
FIG. 9 is a diagram showing the basic system configuration of a chemical decontamination system to which a third embodiment of a chemical decontamination method in accordance with the present invention is applied.

FIG. 9 is a diagram showing the basic system configuration of a chemical decontamination system to which a third embodiment of a chemical decontamination method in accordance with the present invention is applied.

Figure 7B:
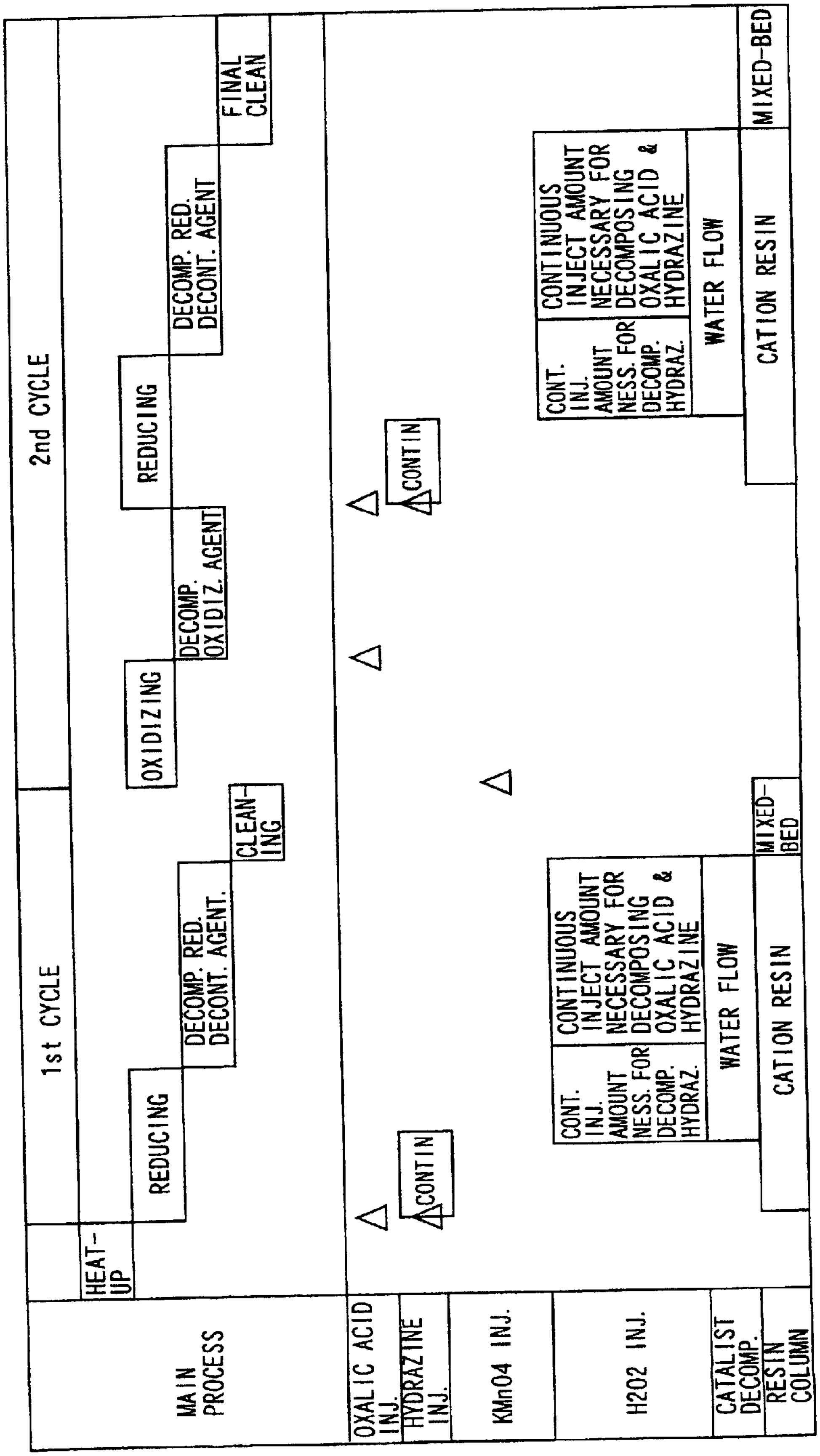

The main process in the present embodiment of the chemical decontamination method is shown in FIG. 7(B). A different point of Embodiment 3 from Embodiment 1 (system configuration of FIG. 1) is that the position of the catalyst decomposition column 6 and the position of the cation resin column 7, the mixed-bed resin column 14 and the cooler 5 are in inverse order.

In Embodiment 3, the cooler 5, the cation resin column 7 and the mixed-bed resin column 14 are arranged in the upstream side of the catalyst decomposition column 6.

An advantage of the system configuration shown in Embodiment 3 is that the concentration of radioactivity in the water flowing to the catalyst decomposition column 6 is low because the water flows into the catalyst decomposition column 6 after flowing through the cation resin column 7, and consequently accumulation of radioactivity in the catalyst decomposition column 6 can be substantially suppressed. Further, it is unnecessary to decompose hydrazine by the catalyst decomposition column 6 until hydrazine breaks through the cation resin column 7.

On the other hand, after hydrazine breaks through the cation resin column 7, injection of hydrazine is unnecessary, and an excessive amount of hydrazine flowing out corresponding to an amount of metallic ions trapped in the cation resin column 7 is decomposed in the catalyst decomposition column 6. The water flow rate to the catalyst decomposition column 6 may be controlled so as to maintain the pH of the decontamination solution at 2.5. The procedure of the other processes is basically the same that of Embodiment 1 (FIG. 1 to FIG. 6).

That is, in this embodiment, each of the modes of the main process shown in FIG. 7(B) is successively performed, and opening and closing of the valves and the contents of processing in each of these modes are the same as the processing of Embodiment 1 shown in FIG. 7(A) except for the above-mentioned points.

[Embodiment 4]

Figure 10:
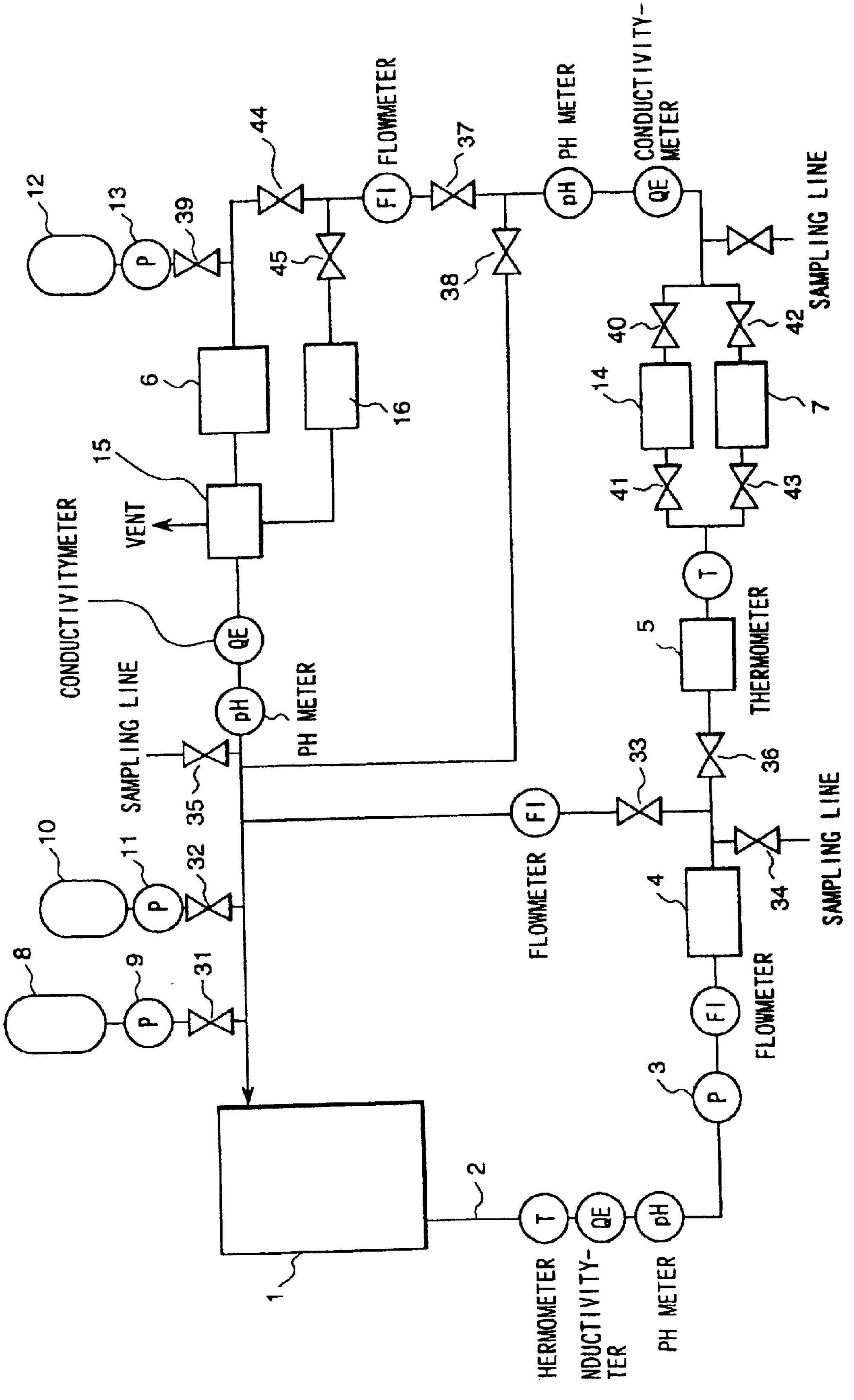
FIG. 10 is a diagram showing the basic system configuration of a chemical decontamination system to which a fourth embodiment of a chemical decontamination method in accordance with the present invention is applied.

FIG. 10 is a diagram showing the basic system configuration of a chemical decontamination system to which a fourth embodiment of a chemical decontamination method in accordance with the present invention is applied.

Figure 7C:
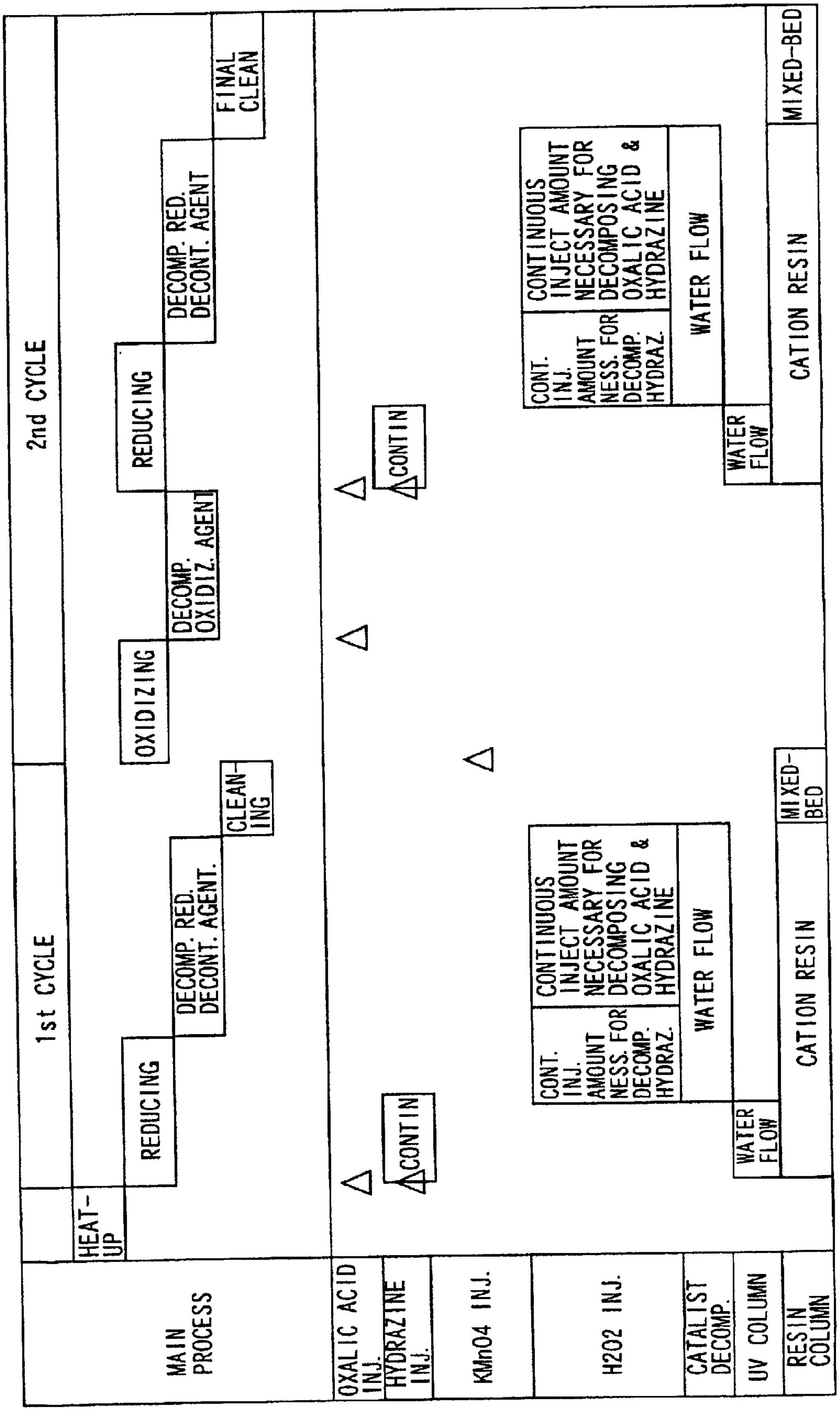

The main process in the present embodiment of the chemical decontamination method is shown in FIG. 7(C).

The system of Embodiment 4 is constructed by adding a UV column (ultraviolet ray irradiation apparatus) 16 to the configuration of Embodiment 3 and arranging the UV column in parallel to the catalyst decomposition column 6. The piping route is branched at the exit of the flowmeter F1 into a route from the exit of the flowmeter F1 to the UV column 16 and the gas-liquid separating tank 15 through a valve 45 and a route from the exit of the flowmeter F1 to the catalyst decomposition column 6 and the gas-liquid separating tank 15 through a valve 44. During the reducing agent decontamination in the first and the second cycles under water flow operation to the cation resin column 7 (the valve 44 is closed and the valve 45 is opened), the water is allowed to flow though the UV column 16, and trivalent iron complex is reduced to bivalent iron ions to be removed by the cation resin column 7. Because the trivalent iron complex cannot be removed by the cation resin column 7 due to being an anion type, the decontaminating solution with a high iron concentration proceeds to the next process of decomposing the reductive decontaminating agent. In such a case, iron deposits on the catalyst to decrease the catalyst power. The system of Embodiment 4 has an effect to suppress decrease of the catalyst power. The lifetime of the catalyst can be lengthened and an amount of catalyst disposed as radioactive products can be reduced. The processing and opening and closing of the valves in the other processes in the main process shown in FIG. 7(C) are the same as those of Embodiment 3. However, in the reductive decontaminating agent decomposing mode, the valve 44 is opened and the valve 45 is closed. Particularly, in the reductive decontaminating agent decomposing mode, hydrogen peroxide is injected into the decontaminating solution from the hydrogen peroxide tank 12 by an amount necessary for decomposing both of oxalic acid and hydrazine, similarly to in Embodiment 1.

According to the present invention, since increase in the amount of waste products caused by adding hydrazine can be suppressed, it is possible to increase the pH of the decontaminating solution to a value higher than that of a decontaminating solution using solely oxalic acid and it is possible to perform decontamination of a system including a low corrosion resistant material. Further, since hydrazine can be selectively decomposed by only one catalyst decomposition column and oxalic acid can be decomposed together with hydrazine, the cost in regard to the decontaminating agent decomposition apparatus can be reduced.

What is claimed is:

1. A chemical decontamination apparatus arranged in a circulation line connected to a portion to be decontaminated for chemically decontaminating radioactive nuclides from the portion contaminated by the radioactive nuclides, the apparatus comprising:

agent injectors for injecting oxalic acid and hydrazine as a reductive decontaminating agent into the portion through the circulation line for reductively decontaminating the radioactive nuclides from the portion; and a catalyst decomposition column arranged in the circulation line for decomposing at least the oxalic acid and the hydrazine in the reductive decontaminating agent.

2. A chemical decontamination apparatus as claimed in claim 1, wherein said catalyst decomposition column is arranged downstream of an ion exchange resin column in the circulation line.

3. A chemical decontamination apparatus as claimed in claim 2, wherein an $H_2O_2$ injector is arranged downstream of said ion exchange resin column and upstream of said catalyst decomposition column in the circulation line.

4. A chemical decontamination apparatus as claimed in claim 2, wherein a pH monitor is arranged downstream of said agent injectors and upstream of said ion exchange resin column.

5. A chemical decontamination apparatus as claimed in claim 1, further comprising a bypass line for bypassing said catalyst decomposition column.

6. A chemical decontamination apparatus as claimed in claim 1, further comprising a heater for heating treating water installed in said circulation line.

7. A chemical decontamination apparatus arranged in a circulation line connected to a portion to be decontaminated for chemically decontaminating radioactive nuclides from the portion contaminated by the radioactive nuclides, the apparatus comprising:

agent tanks for injecting oxalic acid and hydrazine as a reductive decontaminating agent into the portion through the circulation line for reductively decontaminating the radioactive nuclides from the portion; and a catalyst decomposition column arranged in the circulation line for decomposing at least the oxalic acid and the hydrazine in the reductive decontaminating agent.

* * * * *